H. D. McFADDIN.
ATTACHMENT FOR DESK LAMPS.
APPLICATION FILED FEB. 15, 1919.
1,384,394.
Patented July 12, 1921.
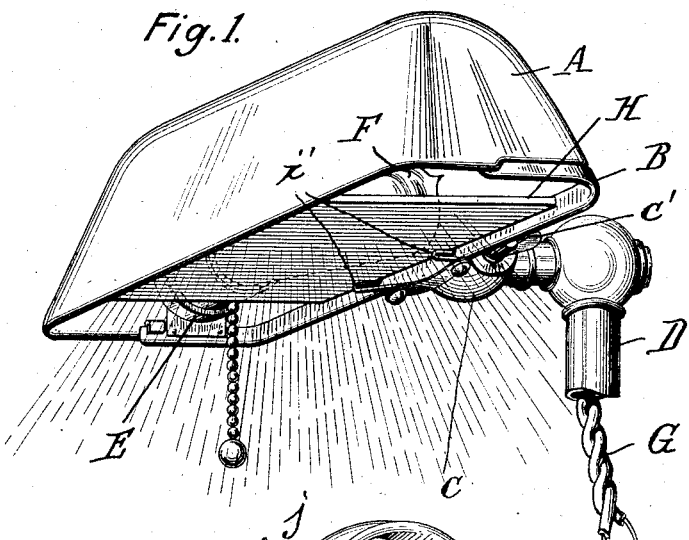
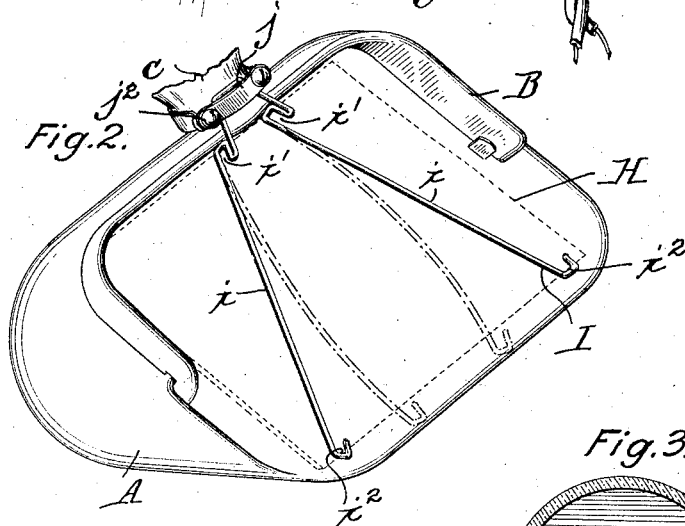
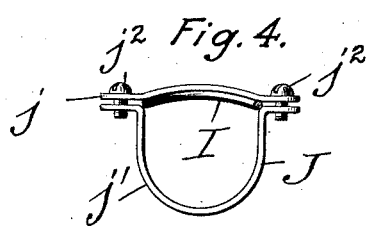
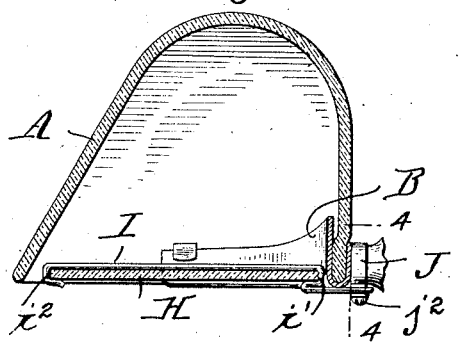
INVENTOR
Harrison D. McFaddin.
BY
Jas. H. Griffin.
ATTORNEY

UNITED STATES PATENT OFFICE.

HARRISON D. McFADDIN, OF EAST ORANGE, NEW JERSEY.

ATTACHMENT FOR DESK-LAMPS.

1,384,394.  Specification of Letters Patent.  Patented July 12, 1921.

Application filed February 15, 1919. Serial No. 277,206.

*To all whom it may concern:*

Be it known that I, HARRISON D. McFADDIN, a citizen of the United States, residing in East Orange, county of Essex, and State of New Jersey, have invented a certain new and useful Attachment for Desk-Lamps, of which the following is a specification.

This invention relates to desk lamps and is more particularly directed to an attachment therefor, the function of which attachment is to lessen eye strain and to transform artificial light into illumination as near as possible to day light.

Desk lamps which have an electric bulb for a source of illumination have long been employed despite the well known fact that the glare from such light is highly injurious to the eyes. Manufacturers have long sought to overcome such glare through particularly shaped and colored reflectors and shades, and while this method of approaching the problem has ameliorated to some extent the effect of glare on the eyes from the direct glare from the source of illumination, there is still that strong reflected light from the surface of the desk, or light colored articles on the desk, directly upon which the light is reflected by the shades or reflectors employed, so that while direct glare has been to some extent overcome, the reflected glare is present in practically every form of desk lamp now used.

The so-called white artificial light is well known as composed of a spectrum embodying seven distinct colors—red, orange, yellow, green, blue, indigo and violet. Each of these colors has a different effect upon the eyes and certain of them having a more or less soothing effect, while certain others produce irritation. It is more or less generally conceded, and I have proven by thorough and exhausted experimentation, that the most irritating colors of the spectrum are red, orange and yellow. In fact, any one who has worked for any length of time under a red or yellow light will appreciate the disagreeable effect upon the eyes, as well as upon the whole nervous system. In day light, the proportioning of the seven component colors referred to is such that the yellow, red and orange are present in relatively small quantities, while in artificial light the red and yellow predominate.

With the foregoing considerations in mind, the object of the present invention is to provide a desk lamp with a device which will allow of the employment of a strong source of illumination, but which will coöperate therewith to eliminate, or at least partially eliminate the deleterious colors of the spectrum of such light, and cause the lamp to deliver illumination which will be softened in tone, as well as superior in quality, due to the absence of harmful colors of the spectrum.

A further object of the invention is to provide such a device which may be readily attached to a stock fixture in a neat and expeditious manner.

Features of the invention other than those specified will be apparent from the hereinafter detailed description taken in conjunction with the accompanying drawings.

In the accompanying drawings I have illustrated one practical embodiment of the invention, but the construction therein shown is to be understood as illustrative only, and not as defining the limits of the invention.

Figure 1 is a perspective view showing the well known form of desk lamp with the attachment of the present invention associated therewith;

Fig. 2 is another perspective view thereof;

Fig. 3 is a central section through the lamp shade or reflector, showing the manner of mounting the attachment on the fixture which supports the shade; and Fig. 4 is a section on line 4—4 of Fig. 3.

While the present invention may be used with various types of desk lamps, I have chosen for the purpose of illustration, the application of the invention to one of the well known forms of desk lamps now on the market. In this form of lamp, the shade or reflector A is seated in a channeled shade holder B, supported by a stem C of a standard D. The standard D, which is made in various shapes, and suitably ornamented, is provided with a base (not shown) for supporting the standard in upright position. A lamp socket E is mounted on the shade holder B and carries a lamp F, to which current is supplied through an electrical connection G led up through the hollow standard D, and passing to the socket E. In the stem C of the standard is a regulating joint $c$ with which is associated a clamping wing nut $c'$, this structure allowing of the bodily tilting of the holder, shade and lamp for manifest reasons.

The object of the present invention is to interpose in the illuminating rays a transparent or translucent medium through which the light may readily pass, but during which passage the objectionable colors of the spectrum of said light will be absorbed or dissolved. As shown in the drawings, this means consists in a flat panel of glass H, forming a screen or filter through which the light must pass. The screen H is normally held in a position slightly above the lower edge of the reflector A by means of a novel holder adapted to detachably grip the screen and maintain the same in proper position. The holder is in the form of a continuous piece of wire I, secured at its central portion to one member $j$ of the clamp J, shown in detail in Fig. 4. The other member $j'$ of the clamp is in the form of a yoke. The clamp J is adapted to straddle the stem C of the lamp supporting standard and be secured thereto by binding screws $j^2$ as will be readily understood. The wire I extends from the central portion, where it is attached to the clamp J in the form of two resilient arms $i$, which, because of the resilient character of the wire, normally partake of the diverging relation shown in Fig. 2. Each arm $i$ is provided with two relatively fixed clamping jaws $i'$ and $i^2$ which are of a slightly greater distance apart, measured longitudinally of the arms $i$, than the width of the screen H.

When it is desired to attach the screen H, it is only necessary to force the free ends of the arms $i$ toward one another so that they partake of the dotted line positions shown in Fig. 2. The screen may then be positioned in the lower open end of the shade A with its rear edge in engagement with the clamping jaws $i'$. If the arms $i$ are then released they will spring apart until the clamping jaws $i^2$ engage with the opposite edge of the screen as shown in full lines in Fig. 2. As the clamp is rigidly secured to the stem of the holder, and the wire I is sufficiently heavy to properly support the screen, the screen will be maintained in the position shown in Fig. 1, directly below the lamp F, so that the light illuminating directly from the lamp or reflector will be caused to pass through the screen H.

The screen is of colored glass of such tints that it will absorb the red, yellow and orange colors in the light during the passing of the light therethrough, and either one or both of the surfaces of said screen is preferably ground or frosted so that the light will be diffused in such manner as to have the best possible illuminating value. The screen is shown rectangular in shape with sharp corners, but such shape may be modified without departing from the spirit of the invention.

As hereinbefore stated, the attachment of the present invention is preferably secured to the stem of the shade holder or standard as this provides a convenient means for attachment. However, it is not limited in this regard, since, manifestly, with a non-adjustable stem, the attachment might be conveniently mounted directly on the standard D, this change requiring only a slightly different form of mounting.

It will be understood that mechanical and formal changes may be made in the structure described, such as the substitution of equivalents, without departing from the spirit or substance of the invention, the scope of which is commensurate with the appended claims.

Having thus fully described the invention, what I claim as new, and desire to secure by Letters Patent is:

1. A desk lamp embodying a source of light and a reflector supported by a standard, in combination with a single ply colored light screen, having a dull or frosted surface, positioned in the open side of said reflector, and a plurality of resilient gripping jaws, supported by the standard and supporting the screen in position, said screen serving to divest the light rays from the source of light passing therethrough of the deleterious colors of the spectrum and produce a soft diffused illumination, restful to the eyes.

2. A desk lamp embodying a source of light and a reflector supported by a standard, in combination with a single ply colored light screen positioned in the open side of said reflector, and having its outer surface dull or frosted, and a plurality of resilient gripping jaws supported by the standard and supporting the screen in position, said screen serving to divest the light rays from the source of light passing therethrough of the deleterious colors of the spectrum and produce a soft diffused illumination, restful to the eyes.

3. A desk lamp embodying a source of light and a reflector supported by a standard, in combination with a single ply colored light screen, having a dull or frosted surface, supported by the standard and positioned in the open side of the reflector, said screen serving to divest the light rays from the source of light passing therethrough of the deleterious colors of the spectrum and produce a soft diffused illumination, restful to the eyes.

4. A desk lamp embodying a source of light and a reflector supported by a standard, in combination with a colored light screen also supported by the standard, independently of the reflector, and positioned in the open side of the reflector, said screen serving to divest the light rays from the source of light passing therethrough of the deleterious colors of the spectrum and produce a soft diffused illumination, restful to the eyes.

5. A desk lamp embodying a source of light and a reflector, in combination with a single ply colored light screen, having a dull or frosty surface, a holder, provided with resilient arms each of which is formed with spaced gripping jaws adapted to detachably grip and support the screen at the open side of the reflector, said screen serving to divest the light rays from the source of light passing therethrough of the deleterious colors of the spectrum and produce a soft diffused illumination, restful to the eyes.

6. A desk lamp embodying a source of light and a reflector, combined with a translucent screen, a holder for the reflector, a clamp to engage the lamp supporting standard, and a holder for said screen comprising a continuous resilient member supported by said clamp and having resilient arms engageable with an edge of the screen.

7. A desk lamp embodying a source of light and a reflector, combined with a translucent screen, a holder for the reflector, a clamp to engage the lamp supporting standard, and a holder for said screen comprising a continuous resilient member supported by said clamp and having resilient arms engageable with an edge of the screen and positioned to hold the said screen slightly above the lower edge of the protector.

In testimony whereof I have signed my name to this specification.

HARRISON D. McFADDIN.